(12) United States Patent
Yudell et al.

(10) Patent No.: US 12,049,956 B2
(45) Date of Patent: Jul. 30, 2024

(54) VEHICLE WITH CONTINUOUSLY VARIABLE TRANSMISSION HAVING OPERATIONAL MODES

(71) Applicant: TEAM Industries, Inc., Bagley, MN (US)

(72) Inventors: Alexander C. Yudell, Bemidji, MN (US); Carlos Romo Ramírez, Bemidji, MN (US); Bruce H. Younggren, Bemidji, MN (US); Michael Allen Mueller, Bemidji, MN (US); Jason S. Koskela, Park Rapids, MN (US); Ronald Joseph Wendt, Bemidji, MN (US); John Edward Hamrin, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 18/315,945

(22) Filed: May 11, 2023

(65) Prior Publication Data

US 2023/0366463 A1 Nov. 16, 2023

Related U.S. Application Data

(60) Provisional application No. 63/342,002, filed on May 13, 2022.

(51) Int. Cl.
*F16H 61/662* (2006.01)
*F16H 9/16* (2006.01)

(52) U.S. Cl.
CPC ........ *F16H 61/66259* (2013.01); *F16H 9/16* (2013.01); *F16H 2061/66204* (2013.01)

(58) Field of Classification Search
CPC ................. F16H 61/66259; F16H 9/16; F16H 2061/66204
See application file for complete search history.

(56) References Cited

U.S. PATENT DOCUMENTS

| 10,486,705 | B2 | 11/2019 | Haack et al. |
| 11,143,285 | B2 | 10/2021 | Eck et al. |
| 11,485,225 | B2 | 11/2022 | Younggren et al. |
| 11,499,608 | B2 | 11/2022 | Yudell et al. |

(Continued)

FOREIGN PATENT DOCUMENTS

| CN | 105934611 B | * | 8/2018 | .......... B60W 10/026 |
| DE | 112014007208 T5 | * | 8/2017 | ............... F16G 1/28 |

(Continued)

*Primary Examiner* — Justin Holmes
(74) *Attorney, Agent, or Firm* — Fogg & Powers LLC

(57) ABSTRACT

A vehicle with continuously variable transmission operational modes is provided. The vehicle includes a motor to provide engine torque; a driveline; a continuously variable transmission (CVT), an actuator, a memory and a controller. The CVT is configured to couple torque between the motor and the driveline. The actuator is in operational communication with the CVT to selectively set operating characteristics of the CVT. The memory stores operating instructions including operational mode. The controller is in communication with the memory and the actuator. The controller configured to control the actuator based on one or more of the operational modes.

19 Claims, 3 Drawing Sheets

(56) References Cited

U.S. PATENT DOCUMENTS

2006/0234822 A1\* 10/2006 Morscheck ......... F16H 37/0833
 475/211
2018/0211454 A1\* 7/2018 Carlson .................. F16H 57/01
2019/0092312 A1 3/2019 Hamrin et al.

FOREIGN PATENT DOCUMENTS

ES 2619684 T3 \* 6/2017 ............ B60W 10/02
WO WO-2008007188 A1 \* 1/2008 ............ B60W 10/02

\* cited by examiner

VEHICLE WITH CONTINUOUSLY VARIABLE TRANSMISSION HAVING OPERATIONAL MODES

CROSS-REFERENCE TO RELATED APPLICATIONS

This application claims priority to U.S. Provisional Application Ser. No. 63/342,002, titled Vehicle With Continuously Variable Transmission Drive Modes, filed on May 13, 2022, which is incorporated in its entirety herein by reference.

BACKGROUND

The use of continuously variable transmissions (CVT) in vehicles provides advantages over traditional transmission due to the infinite gearing ratios that a CVT provides. A CVT includes a primary pulley which may also be referred to as a first sheave, drive clutch, or a drive pulley and a secondary pulley which may also be referred to a driven sheave, driven clutch, or driven pulley. The primary pulley and secondary pulley are in rotational communication with each other via endless looped member such as a belt. The primary pulley is typically in rotational communication with an engine to receive engine torque and the secondary pulley is typically in rotational communication with the driveline of an associated vehicle. Both the primary pulley and the secondary pulley may include a movable sheave that is configured move axially on a post and a fixed sheave. The movable sheave axially moves on the post either away from or towards the fixed sheave based on rpm or applied torque. The belt, riding on faces of the fixed and movable sheave assemblies moves radially either towards a central axis or away from the central axis of the primary pulley or secondary pulley therein changing the gear ratio of the CVT.

For the reasons stated above and for other reasons stated below which will become apparent to those skilled in the art upon reading and understanding the present specification, there is a need in the art for a CVT with operational modes that set operating characteristics (i.e. gear ratios) of the CVT.

SUMMARY OF INVENTION

The following summary is made by way of example and not by way of limitation. It is merely provided to aid the reader in understanding some of the aspects of the subject matter described. Embodiments provide a vehicle with a continuously variable transmission with operational modes that set the operating characteristics based at least in part on an operational mode of the CVT.

In one example, a vehicle with a CVT that has operational modes is provided. The vehicle includes a motor, a driveline, at least one actuator, at least one sensor, a memory and a controller. The motor provides engine torque. The CVT is configured to couple torque between the motor and the driveline. The CVT includes a primary pulley, a secondary pulley, and an endless looped member. The primary pulley is in operational communication with the motor. The secondary pulley is in operational communication with the driveline. The endless looped member operationally couples the primary pulley and the secondary pulley. The at least one actuator is in operational communication with the CVT to selectively set operating characteristics of the CVT. The memory is used to store operating instructions including operational modes. The operational modes included at least one of an adjustable descent control mode, a descent mode cruise control mode; a tractor mode and an automatic differential lock mode. The controller is in communication with the memory, the at least one sensor and the at least one actuator. The controller is configured to control the at least one actuator based on at least one of the operational modes stored in the memory.

In another example, another vehicle with a CVT having operational modes is provided. The vehicle includes a motor to provide engine torque; a driveline, a CVT, launch clutch, at least one actuator, at least one sensor, at least one memory and a controller. The driveline includes an ATM clutch. The CVT is configured to couple torque between the motor and the driveline. The CVT includes a primary clutch, a secondary clutch and an endless looped member. The primary pulley is in operational communication with the motor. The secondary pulley is in operational communication with the driveline. The endless looped member operationally coupling the primary pulley and the secondary pulley. The launch clutch is positioned between the motor and the primary pulley of the CVT. The at least one actuator is in operational communication with the CVT to selectively set operating characteristics of the CVT and selectively activate the launch clutch. The memory stores operating instructions including operational modes. The operational modes included at least one of an adjustable descent control mode, a descent mode cruise control mode; a tractor mode and an automatic differential lock mode. The controller is in communication with the memory, the at least one sensor and the at least one actuator. The controller is configured to control the at least one actuator to control at least one of the CVT and the launch clutch based at least in part on at least one of the operational modes stored in the memory to control operations.

In yet another embodiment, a method of operating a vehicle with a CVT having operational modes. The method includes monitoring at least one sensor of the vehicle for sensor signals; determining at least one operational mode selected for the CVT; and implementing the at least one selected operational mode selected for the CVT by at least in part controlling a transmission ratio based on a transmission map associated with the at least selected operational mode and the sensor signals, wherein the at least one selected operational mode includes at least one of an adjustable descent control mode, a descent mode cruise control mode; a tractor mode and an automatic differential lock mode.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

Figure 1:
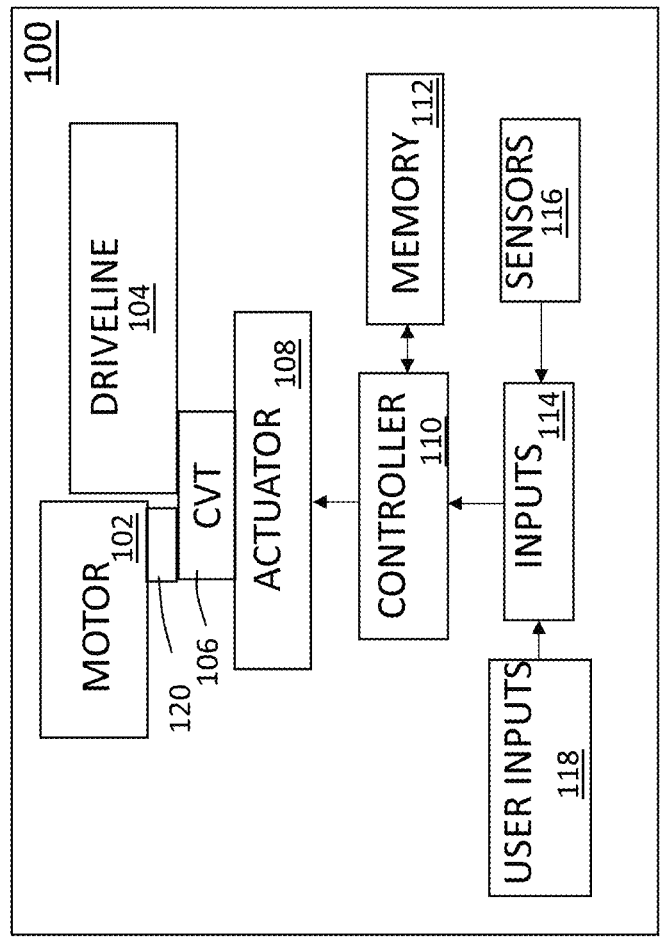
FIG. 1 is a block diagram of a vehicle with continuously viable transmission having operational modes according to an example aspect of the preset invention.

In the following detailed description, reference is made to the accompanying drawings, which form a part hereof, and which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a vehicle with continuously variable transmission (CVT) with one or more operational modes. The vehicle block diagram of FIG. 1 and the vehicle schematic diagram of FIG. 2 illustrate a vehicle 100 with continuously variable transmission having operational modes in an example. Vehicle 100 includes a motor 102 to generate torque. Motor 102 may be an internal combustion engine, an electric motor or any type of motor that produces engine torque to a CVT 106. CVT 106 may also be referred to as a variator. CVT 106 includes a primary pulley 210 that is in communication with the motor 102 and secondary pulley 212 that is in communication with a driveline 104 of the vehicle 100 as illustrated in the schematic diagram of vehicle 100 in FIG. 2. Driveline 104 may include a further gear box 206, prop shafts 214 and 216, half shafts 218a, 218b, 220a and 220b, differentials 224, wheels 226a, 226b, 228a and 228b, etc. The primary pulley 210 may be in operational communication with the secondary pulley 212 with an endless loop member 230, such as a belt. The gear box 206, in this example, includes a park gear 207, a low gear 209, a reverse gear 211, and a high gear 215. The gearing is selected with movable shift dogs 217 and 219.

As discussed above, a CVT changes gear ratio by moving the belt up and down on belt engaging surfaces of the respective primary and secondary pulleys based on at least one of input torque, output torque, a driver demand such as pedal position, vehicle speed, and engine speed. In example embodiments, the shifting characteristics of the CVT 106 are modified by at least one actuator 108. The actuator 108, in one example, is a hydraulic system that uses a number of hydraulic valves to change the gear ratio of the CVT 106 based at least in part on a selected operating mode. Other types of actuators 108 are contemplated includes electrically and mechanical powered actuators.

Each of the primary and secondary pulleys 210 and 212 of the CVT 106 include a movable sheave portion that moves with respect to a fixed sheave portion. In an embodiment, the at least one actuator 108 selectively moves one or both of the movable sheave portions to change the gearing ratio of one or more of the primary and secondary pulleys 210 and 212.

Figure 2:
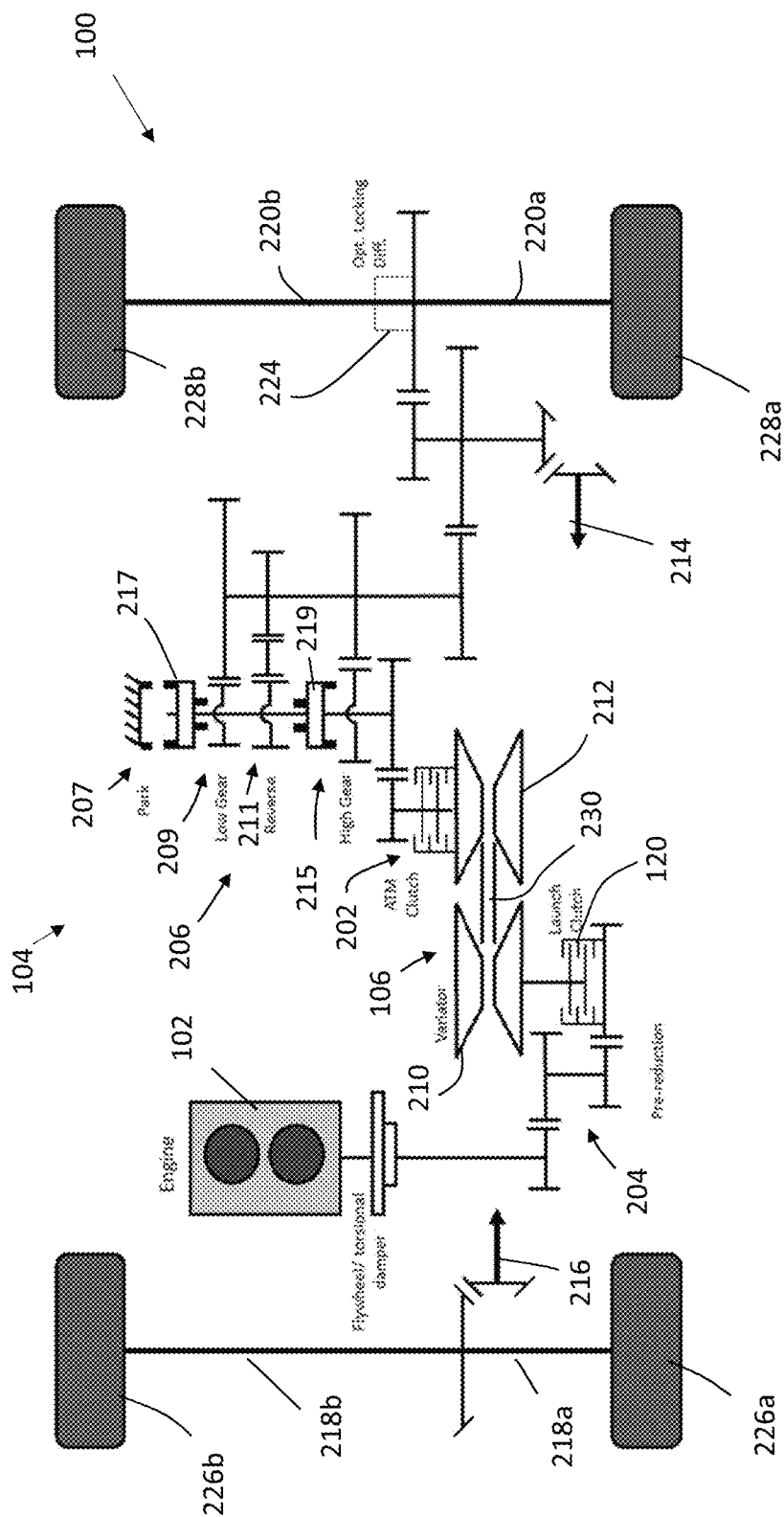
FIG. 2 illustrates a schematic diagram of the vehicle with continuously viable transmission having operational modes of FIG. 1.

Each of the at least one actuator 108, in the example of FIG. 1, is controlled by a controller 110. Controller 110 is in communication with memory 112 that includes operation instructions implemented by the controller 110. In general, the controller 110 may include any one or more of a processor, microprocessor, a digital signal processor (DSP), an application specific integrated circuit (ASIC), a field program gated array (FPGA), or equivalent discrete or integrated logic circuitry. In some example embodiments, a controller may include multiple components, such as any combination of one or more microprocessors, one or more controllers, one or more DSPs, one or more ASICs, one or more FPGAs, as well as other discrete or integrated logic circuitry. The functions attributed to the controller 110 herein may be embodied as software, firmware, hardware or any combination thereof. The controller 110 may be part of a system controller or a component controller such as, but not limited to an engine control module, a vehicle controller, transmission controller, etc. The memory 112 may include computer-readable operating instructions that, when executed by the controller provides functions of shifting the CVT to modify normal operating characteristics of the CVT. Such functions may include the functions of applying different operational modes described below. The computer readable instructions may be encoded within the memory 112. Memory 112 is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically-erasable programmable ROM (EEPROM), flash memory, or any other storage medium.

The controller 110 based on operating instructions (that include the operational mode instructions) stored in memory 112 and inputs described below selectively modifies the shifting characteristics of the CVT. The memory 112 in an example includes the operating instructions (system) with the operational modes that are implemented by the controller 110.

The inputs 114 provided to the controller 110 may come from one or more sensors 116. The sensor provided information includes, but is not limited to, accelerator pedal position, brake pedal position, wheel position (each of four wheels in a four-wheel vehicle), transmission shaft speed, axle shaft speed, prop shaft speed between transmission and front drive, engine crankshaft speed, acceleration information from accelerometers, orientation information from gyroscopes, location information from global positioning systems (GPS), radar information from radar, image information from vision systems, suspension load, transmission sump oil temp, transmission hydraulic pressures, steering angle, traction control, altimeter information from altimeters, and incline information from inclinometers.

Other inputs 114 that may be provided by sensors 116 include engine torque (control area network (CAN)), variator ratio, vehicle speed (CAN), PRNDL position (operation position), ignition status, primary pulley speed, secondary pulley speed, front drive disconnected and/or locked, and user interface inputs 118.

User inputs 118 provide a way for a user to control, at least in part, the shifting characteristics of the CVT through operating system stored in memory 112 and implemented by the controller 110. User interfaces may include, but are not limited to, buttons, knobs, sliders, touch screens, voice activation, Bluetooth inputs and devices, smart phone devices, and cell signals.

A transmission operational mode determines, at least in part, the operating parameters of the driveline (or drivetrain in an embodiment) by observing a set of inputs and sensors located on vehicle 100. The engine speed and throttle position determines the torque, and power sent through the driveline. It also generates a key aspect of noise, vibration and harshness (NVH) produced by the vehicle. Lower engine speed generally improves NVH and higher engine RPM generally improves power output. Changing the variator ratio has a direct influence on engine operating speed. As discussed above, the memory 112 (which may be part of a transmission control module (TCM)), contains algorithms ('maps') that modulate ratio to deliver a target engine speed for the particular mode selected and the current operating parameters. Operating parameters may include vehicle speed, accelerator pedal position, vehicle pitch and other sensor inputs.

A launch clutch 120 is a friction element that connects and disconnects the engine from the driveline, these events are termed 'synchronization' and 'de-clutching', respectively. The launch clutch 120 is positioned between the motor 102 and the CVT 106 in the example of FIG. 1. As a friction element, heat is generated at the launch clutch 120 and must be managed to avoid damage to the clutch 120. Different modes described below benefit from tailored launch clutch 120 behavior. In an example, a hydraulic system, such as the actuator 108, is used to control the launch clutch 120. In another example, the launch clutch may be a centripetal clutch.

The schematic diagram of a vehicle 100 of FIG. 2 illustrates the launch clutch 120 in this example is positioned between the motor 102 and the CVT 106. Further in this example pre-reduction gearing 204 is positioned between an output of the motor 102 and the launch clutch 120. This example further illustrates an ATM clutch 202 that provides operational communication between the secondary sheave of the CVT 106 and a gear box 206 of the driveline 104.

Figure 3:
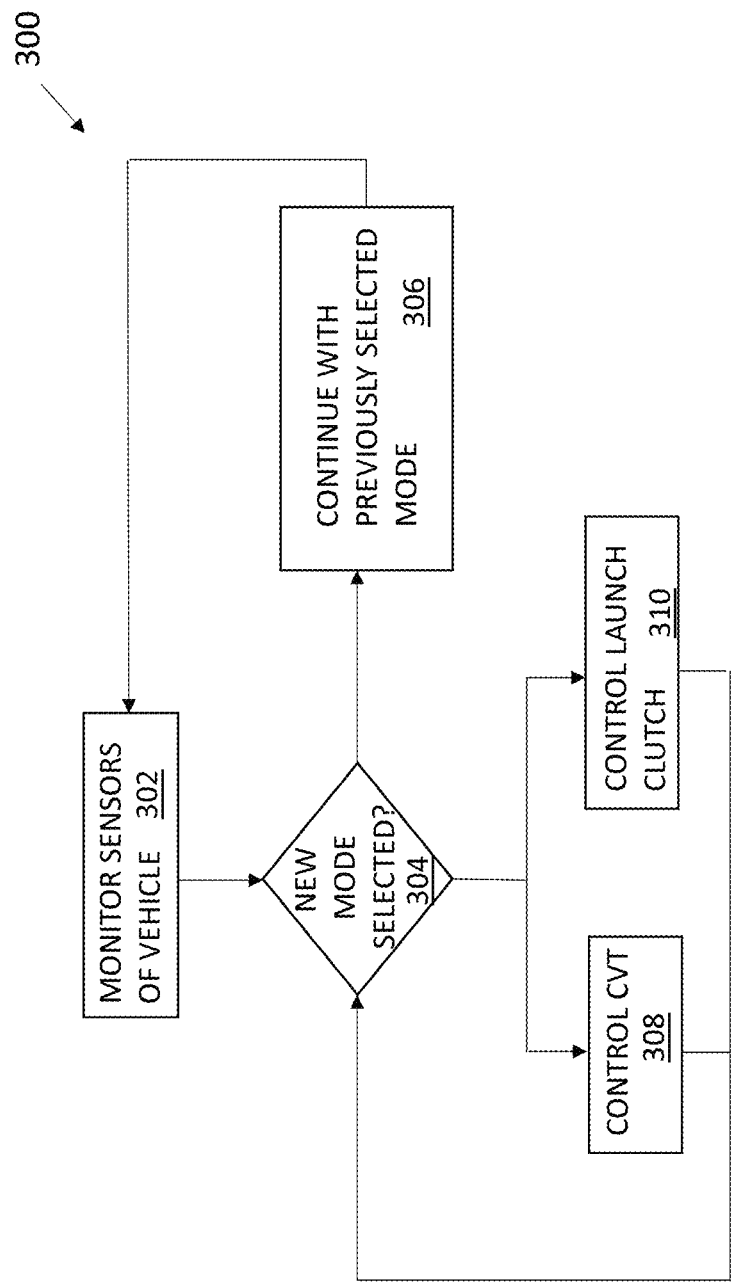
FIG. 3 is an operating characteristics flow diagram according to an example aspect of the preset invention.

FIG. 3 illustrates a method in an operating characteristics flow diagram 300 used to set operating characteristics of a CVT. Controller 110 and actuator 108 may be used to implement a method of the operating characteristics of the CVT 106 and launch clutch 120 to achieve desired operating characteristics of a vehicle such as vehicle 100 illustrated in FIGS. 1 and 2. In an example, the controller 110 implements a transmission map stored in memory 112 to implement a desired operating mode. Flow diagram 300 is provided in sequential blocks. The blocks may occur in a different sequence or even in parallel in other examples. Hence the current invention is not limited to the sequence of blocks set out in FIG. 3.

At block 302 sensor outputs are monitored. As discussed above, sensor outputs may come from sensors that sense engine torque (CAN), variator ratio, vehicle speed (CAN), PRNDL position, ignition status, primary pulley speed, secondary pulley speed, front drive disconnected and/or locked, etc. At block 304 it is determined if a new operation mode is selected. If it is determined that a new operation mode is not detected at block 304, a current previously selected mode is maintained to control operations of the CVT 106 at block 306. The process then continues at block 302.

If it is determined at block 304 that a new mode is selected, the CVT is controlled at block 308 and the launch clutch 120 is controlled at block 310 at least part based on the new mode and the process continues at block 304. In some examples, at least some operational modes are not selected by an operator of the vehicle but are set at the factory to achieve a desired driving characteristic of the vehicle either all the time or when the vehicle encounters an operating condition (determined by outputs of one or more sensors 116) that indicates an operation mode should be used. Further, one or more operating modes may be implemented in a vehicle.

Examples of operation modes include, but are not limited to, an adaptive gross vehicle weight (GVW) operational mode, cruise control mode, a desert/dune riding mode, an adjustable descent control mode, descent cruise control mode, automatic differential lock mode, a discrete gear transmission mimic mode, an operator customized mode, a dyno mode, an engine braking mode, a fuel economy mode, a hill descent/mountain mode, a military mode, a mud mode, a NVH (quiet) mode, a paddle shift mode, performance/sport mode, a plow mode, a rock crawl mode, shuttle shift mode, a snow mode, a supervisor mode, a tow mode, a track mode, a tractor mode, a trailer backup mode, a turf mode/traction limit mode, a work mode, an actuator park engage/disengage mode, a launch control mode, a high altitude adjustment mode, a hill hold mode, a personalized key fob mode, an engine rpm dynamic mode, a vehicle creep mode, a tire diameter adaptive mode, a jump mode, shift-on-the-fly mode, a gradient detection mode, an engine speed trajectory shaping mode, a gravel/low coefficient of friction mode, a tire slip detection mode, a pulley fixed pressure mode, a self-clean inhibit function mode, a valve self-clean mode, a clutch thermal protection mode, a wheel lockup/panic stop routine mode, a wide open throttle strategy mode, an active torque management control strategy mode, a rollback strategy mode, a launch clutch control strategy mode, a variator target ratio selection mode, a variator control mode, an engine anti-stall mode, a cold weather warmup strategy mode, a hydraulic temperature compensation mode, an end of line (EOL) testing and calibration mode, a variator dither mode, a launch clutch kiss-point adaption mode, a variator feed forward adaption mode, a drag removal strategy mode, and a variator backshift function mode. Descriptions of the operation modes are provided below. Some of the operating modes may be user selected while other operation modes may be set during manufacture of the vehicle, so they are applied every time the vehicle is operating.

The GVW operational mode may be used at least in part to control the shifting of the CVT 106. In this example, controller 110 observes sensor data and calculates an approximate vehicle and trailer weight. A transmission map, that may be stored in memory 112, is adjusted to optimize performance based on engine torque curve and a combined calculated mass in this example.

The cruise control mode may be a driver selectable setting where the vehicle maintains a constant speed. When cruise control mode is engaged, a cruise control map will become engaged. The motor 102 and CVT 106 must work together to deliver optimal NVH or fuel economy performance. The transmission map may optimize engine speed for NVH, fuel economy or a combination of both in this mode.

Desert and dune operation mode has unique vehicle performance requirements which include high speed/high power running, running through sand/high resistance terrain, and wheel slip due to low traction in sand. The desert/dune mode disables restrictions on wheel acceleration rate to enable sand churning. The desert/dune mode may have a transmission map that trends engine speeds toward peak engine power.

The descent control mode utilizes transmission ratio to increase or decrease engine speed during a hill descent. Greater engine speed at low or zero pedal input results in higher negative torque to the wheels, thus slowing vehicle descent. Descent control mode may be automatically activated based on vehicle sensor and CAN data input. Descent control may be manually activated by an operator. In an embodiment, descent control power is set by the OEM. In another embodiment, descent control power may be set by a user interface. In another embodiment, the descent control may be automatically activated and set through calculations based on inputs from one or more vehicle sensor and CAN signals.

The adjustable descent cruise control mode can be used to target a specific vehicle speed during downhill operation. The mode uses a speed sensor or CAN signal related to ground speed or others as a closed loop feedback. Engine speed and thus engine braking power is controlled by modulating the transmission ratio. In an embodiment, the driver directly inputs a speed via a user interface. In another embodiment, downhill speed is set at an instantaneous value when the driver lifts their foot from the pedal. Speed may be increased by applying pedal, the new speed at pedal lift is the set point. Speed may be reduced by applying brake. The new speed at brake lift is the set point.

In the automatic differential lock mode, controller 110 may control the differential locking actuator. The actuator may lock the differential based on a gear selector status signal, or user selected transmission mode. The controller 110 may automatically engage a differential locking device in response to driving conditions which may include but are not limited to: vehicle slide, loss of vehicle traction at one or more wheels, or if aggressive driving is identified.

The discrete gear transmission mimic mode has a transmission target of two or more discrete ratios during operation. Shift logic between the ratios is similar to shifts between an automatic, dual clutch transmission, or automated manual transmission. Inputs may be pedal position, vehicle speed, engine speed and others. Ratios are not necessarily fixed and may be modified slightly from shift to shift to spread belt wear across the sheave faces.

Operator customized mode allows the operator to use a user interface to customize a transmission map per their personal preference. Customization parameters may include target engine speed at low, middle, and high pedal or low, middle, and high speed. The operator may set a limited highest engine rpm target. Any operator customization may be monitored by controller 110 to ensure that engine or vehicle speeds do not go outside of safe operating parameters.

A chassis dynamometer (dyno) may provide an active negative torque to the front and/or rear wheels. In some cases, an active torque can overpower the clamp force of the active torque management (ATM) clutch 202 when clamped for normal driving. If this occurs, the ATM clutch 202 can slip, leading to considerable thermal stress at the ATM clutch. To protect the ATM clutch 202, the dyno mode can be engaged that detects active negative torque at the rear wheels and: Opens the ATM clutch 202 to freewheel the axle, or clamp the ATM clutch 202 with an elevated safety factor against slip to ensure that the ATM clutch 202 does not slip.

Engine braking occurs when motor 102 creates negative torque when the accelerator pedal is lifted at some forward or backward speed. Deceleration due to engine braking is dependent on engine speed and negative engine torque produced. The ability to produce negative torque is limited, so engine braking power can be modulated by modulating engine speed. For example, more engine braking power: higher engine speed or less engine braking power: lower engine speed, engine positive torque request.

With the engine braking mode, a default engine braking profile is fully customizable by the original equipment manufacturer (OEM) across the vehicle speed range. The transmission may change ratio or make torque request to deliver on target engine braking power. In an embodiment, the operator may modulate the engine braking power via a user interface. Engine braking profiles may be different depending on the selected transmission modes or saved driver profile. The CVT 106 must get down to full underdrive ratio during a braking-to-stopped event. In the last moments of a braking to stop event, the vehicle approaches and achieves underdrive. This causes the engine to rise in speed, which increases engine braking power as the vehicle is coming to a halt. This feeling may be undesirable to an operator. To avoid a last moment surge of engine braking power while stopping, the transmission may request the engine to increase the torque being produced from a negative value to a greater torque value in an example.

In the fuel economy mode the transmission map targets the optimal engine operating points per the engine brake specific fuel consumption (BSFC) map for a given speed and driver power request.

The hill descent/mountain mode is typically used in highly gradient terrain. The mode may use heavy engine braking.

In the military mode, operational parameters are optimized for military operation. Minimized NVH may be prioritized for stealth at low pedal. Performance may be prioritized for power at heavy pedal. Sheave clamp safety factors may be increased, sacrificing efficiency for reliability.

In the mud mode, restrictions on wheel acceleration are suppressed. Mud operation requires high wheel speed relative to ground speed due to forward force provided by mass transport by the tires as well as friction. The transmission map may be biased toward high speed and power operation at the expense of NVH.

In the NVH (quiet) mode the transmission map is biased toward low engine speed at a given vehicle speed which reduces engine noise experienced by the user and reduces engine noise for stealthy operation, e.g., approaching a hunting location.

In the paddle shift mode, the operator has one or more input devices that will signal the transmission to change simulated discrete gears. In an embodiment the input devices are a pair of paddles located behind the steering wheel. The discrete gear ratios or gear ratio steps are predetermined by the OEM but may have an amount of dither or float to ensure that wear is spread across the pulley sheave faces. Further in the paddle shift mode, the transmission control module disallows a shift that would cause the engine to stall or overspeed.

In the performance/sport mode, a steady state operating engine speed is biased toward the peak horsepower speed. This allows excellent throttle response because the engine does not have to rise as far to get to peak horsepower speed. In an embodiment, the engine speed is allowed to climb during launch synchronization, resulting in engine speed closer to peak horsepower when the driveline is synchronized.

In the plow mode, peak torque engine speed is prioritized to avoid excessive variator shifting and motor NVH at low speed.

Since rock crawling occurs at very low speed and involves consecutive start and stop events, the rock crawl mode uses a transmission ratio to bias engine running to the peak torque speed. In an embodiment, rollback is restricted by engaging the launch clutch enough to achieve zero speed through closed loop feedback. In another embodiment, rollback may be restricted for a brief duration before being allowed.

In the shuttle shift mode, a forward power path and a reverse power path may have their own clutches. Shuttle shifting executes forward to reverse transitions by smoothly handing off torque from one clutch to the other so the operator will not experience a torque interruption. In an embodiment, forward to reverse changes are commanded by a user interface.

The snow mode may be similar to the mud mode discussed above. In an embodiment, torque vectoring or selective braking is employed to correct lateral slide or loss of traction in the snow mode.

The purpose of supervisor mode is to restrict or enable vehicle operation by employees, inexperienced operators, etc. In one example, a vehicle's top speed may be restricted. In another example, the vehicle's acceleration may be restricted. In another example, a password may be required to disengage supervisor mode. In yet another example, a vehicle's top speed may be increased. In another example, a vehicle's acceleration may be increased.

In the tow mode, engine speed is biased toward peak horsepower operation. In an example, the launch clutch holds the engine at a fixed rpm during launch. Best thermal conditions for the clutch for heavy launch events up hills may be used.

In track mode, rubber tracks may be substituted for wheels in off road vehicles for difficult terrain or deep snow. Tracks require significant engine power to overcome their own internal friction. In an embodiment, engine operation is biased toward peak engine power. In an example, the operator is able to input the track gear reduction for use by the controller 110.

In tractor mode, the engine operates at a fixed rpm. Vehicle speed is modulated by changing the transmission ratio (variator ratio) of the CVT 106. In an embodiment, the engine operates near peak torque. Tractor mode allows the use of implements driven by a PTO shaft.

In the trailer backup mode, vehicle creep is implemented in reverse operation. In an embodiment, creep is implemented only at low pedal input. In another embodiment, creep is implemented whenever the vehicle is in reverse, and the brake pedal is not applied.

In the turf/traction limited mode, the total torque delivered to the wheels is limited to ensure that the tires do not slip. In an embodiment, the controller 110 monitors whether the front drive is engaged and ensures that the total torque delivered to the driving wheels does not exceed a threshold.

The work mode biases engine speed to peak horsepower. In an embodiment, the launch clutch 120 holds the motor 102 at a fixed rpm during launch. Best thermal conditions for the launch clutch 120 for heavy launch events up hills may be used.

In the actuator park engage/disengage mode, a park mechanism may be engaged by an actuator 108, rather than a driver operated cable or lever. Actuator 108 may be electric, hydraulic or another type of actuator. In an embodiment, the controller 110 monitors vehicle operation and prevents park from being engaged over a predetermined threshold. In an embodiment, park may be automatically engaged under certain conditions.

The launch control mode is used for high performance or drag race applications. The launch clutch 120 engages to launch vehicle 100 at a high rpm near peak engine power production. In an embodiment, the motor 102 can be revved to peak power, and the launch clutch 120 can be engaged via a button or other user input 118 when vehicle launch is desired.

In the high altitude adjustment mode, the transmission may use an altitude detection signal from the engine control module (ECM) or transmission control module (TCM). A mode may modify engine speed targets to compensate for engine power loss at altitude.

In the hill assist mode, the vehicle is prevented from rolling backwards when parked nose-up on a hill in forward gear, or nose down on a hill in reverse gear. Hill Assist mode selectively modulates positive torque through the launch clutch 120. Clutch torque may be determined by a closed loop feedback control. Inputs 114 may include vehicle speed, vehicle pitch, brake pedal status or others. Hill assist mode may be temporally limited. After a duration, the hill assist mode may end, and the vehicle is allowed to roll back. The goal of hill assist is to allow the driver to move from the brake pedal to the gas pedal without significant vehicle rollback.

The hill hold mode is similar in concept to the hill assist mode, but the duration of hill hold mode is controlled by the thermal status of the launch clutch 120. When thermal overload is detected, controller 108 will intervene to terminate thermal stress. Operator may be warned via an alarm, torque pulsation, or other alert that intervention is imminent. In some cases, hill hold can continue indefinitely without causing thermal overload on the launch clutch 120. In an embodiment, hill hold mode may be disabled when the operator exits the vehicle 100. In another embodiment, park is automatically engaged when clutch thermal stress is detected or predicted. In another embodiment, park is automatically engaged when the operator exits the vehicle 100.

In the personalized key fob mode, the transmission may react to a personalized driver key fob. User selectable default ratio may be used. Restrictions placed on transmission for a given operator may also be used based on, for example, beginner vs. expert operator and a supervisor mode may be used to restricts speed or other operating parameters. In an embodiment, the user may customize their key fob in the vehicle via a user interface.

In the engine rpm dynamics mode, basic CVT operation holds engine rpm at a target value and changes ratio as speed increases. Some operators have a negative perception of the constant engine speed drone. The engine rpm dynamics mode addresses this issue by allowing the engine to rise slightly with speed in response to an acceleration event. This could occur at low, mid, or heavy acceleration events.

The vehicle creep mode is typically used in low vehicle speed movement (0.1 mph-4 mph). Creep may occur with slipping launch clutch conditions, or locked clutch conditions. In an embodiment of the vehicle creep mode, creep may occur on demand when the pedal detects a small input from the driver and initiate's creep. In another embodiment, creep may occur whenever the vehicle is in drive. A brake signal may or may not cancel creep. In controlling creep, creep may be configured to deliver a specific torque to the wheels or configured with a feedback loop to target a specific ground speed.

In tire diameter adaptability mode, the CVT 106 may be configured to respond to a user input tire diameter to change target ratio accordingly in an embodiment.

In the jump strategy mode, when a jump event is detected, the variator shift rate is restricted to protect the driveline 104. A jump event may be detected by accelerometers or other sensors located on the vehicle. Absent a jump strategy, a transmission controller may command full overdrive or full underdrive if the wheels are accelerated or stopped mid-flight. The jump strategy mode ensures that upon landing, the ratio is close to the optimal ratio given the ground speed. In an embodiment, the ratio may be modulated to change the pitch of an airborne vehicle.

In the dog shift on the fly mode, the transmission may allow shift between low to high dog shift gear ranges through the following process. The controller 110 commands engine torque reduction to eliminate torque bind on dogs. Next, a dog 217 is commanded to disengage low gear. Next, the CVT 106 changes ratio to match speed of high gear dog to the speed of the high gear. Then the high gear dog 219 is engaged. Finally, normal torque delivery commences. The above process can be reversed for a shift from high to low.

In another embodiment, the high and low gears may be clutch or sprag clutch connections.

Various modes and strategies would benefit from the gradient detection mode. Gradient detection may be done directly by accelerometers or inclinometers (sensors 116) located on vehicle 100 that can detect vehicle pitch. In an embodiment, the controller 110 calculates gradient by the wheel acceleration for a given engine torque input. The gradient detection mode can apply to uphill or downhill gradient.

With the engine speed trajectory shaping mode, the software implemented by the controller 110 has the ability to shape the engine speed rise rate by changing ratio to optimize the torque delivery to the ground on a backshift event.

In the gravel/low coefficient of friction (μ) surface detection mode, the controller 110 will calculate the wheel acceleration and compare it to calibrated thresholds. If a threshold is exceeded, the controller 110 reports a low coefficient of friction, and adjusts the variator controller gains to compensate. In an embodiment, the controller 110 demands a torque reduction or ratio change to eliminate the slip.

In the tire slip detection mode, the transmission will read the vehicle speed and calculate the wheel speed acceleration and compare it to calibrated thresholds. If an acceleration threshold is exceeded, the controller 110 will initiate a tire slip routine.

In the pulley fixed pressure mode, under certain operating conditions, the pulleys 210 and 212 are operated at fixed pressure. This transmission function may be activated during low vehicle speed, backshift function activation, wheel lockup and other conditions.

In the valve self-clean mode, upon engine start, hydraulic valves shuttle back and forth in their respective bores to free up any deposits that may have accumulated while the vehicle was parked during a prolonged period of time.

In the self-clean inhibit function mode, when in the life of the vehicle, the engine shuts down or stalls in an unexpected manner (ignition off is not detected) and the variator ratio (CVT ratio) is detected to be not in full underdrive, this variator ratio is then saved in the memory 112 via the controller 110. In the next engine start, the self-clean routine will not activate and the backshift function will activate in its place instead. This is done to ensure that the pull away ratio is always underdrive. During this function activation, accelerator pedal demand is also inhibited.

In the clutch thermal protection algorithm mode, the controller 110, based on instructions sorted in the memory, monitors launch clutch slip and transmitted torque continually. This is taken as an input to calculate the power being dissipated at the launch clutch 120 at any instance. In an embodiment, controller 110 uses the predicted temperature of the launch clutch 120 to trigger clutch cooling flow on and off. This safety algorithm ensures that the launch clutch 120 is able to remain thermally stable and apply cooling during thermal dissipation events based on instantaneous clutch temperature estimations. In an embodiment, controller 110 based on operating instructions can intervene in normal operation to prevent launch clutch 120 over temperature conditions.

In the wheel lockup/panic stop routine mode, the controller 110 continuously calculates wheel acceleration rate. When this threshold is exceeded from an already characterized baseline acceleration profile, the controller 110 initiates a wheel lockup routine. The purpose of the routine is to open ATM clutch 202 to allow the CVT 106 to backshift to underdrive under wheels-locked conditions. In an embodiment, the back shift rate is limited in anticipation of a resynchronization event prior to vehicle stoppage. In another embodiment, driveline resynchronization is restricted until the variator ratio is within some value of a target ratio defined by once the wheels have resynchronized to the ground. This prevents engine overspeed or engine underspeed conditions that may be jarring to the operator.

In wide open throttle (WOT) strategy mode, standstill WOT events use special calibrated clutching and engine speed target shaping strategies by variator ratio. These strategies optimize vehicle speed and feeling and minimize engine speed overshoot.

In active torque management (ATM) control strategy mode, ATM clutch 202 is an actively controlled clutch located in the driveline between the secondary pulley 212 and the wheels 226a, 226b, 228a and 228b. During normal driving, the ATM clutch safety factor on clamp force is in between unity and the variator minimum safety factor. This ensures that the ATM clutch 202 always slips before the CVT 106. The ATM clutch's primary function is to act as a torque fuse to prevent slip between a belt (which may be a steel belt in an example) and primary and secondary pullies 210 and 212 of the CVT 106.

In the rollback strategy mode, the controller 110, based on the operating instructions, has the ability to control the ATM clutch 202 pressure relative to vehicle speed during rollback to synchronize the CVT 106 to ground. Whenever the accelerator pedal is detected being depressed, it will then relaunch using the launch clutch 120 as the slipping clutch.

In the launch clutch control strategy mode, the launch clutch 120 uses closed loop control with engine speed as feedback. Launch clutch target engine speed during synchronization is a function of pedal position. The controller 110 based on the operating instructions has the ability to roll-on and roll-off torque to the clutch when certain conditions are met. The controller 110 also has the ability to control slip rate of the launch clutch 120.

In the variator target ratio selection mode, the CVT 106 uses vehicle speed and pedal position (driver intent) to select a target engine speed. The target CVT ratio is a function of vehicle speed and target engine speed.

Low driving surfaces with low coefficient of friction (COF) may require different variator control gains. In the low COF Low-μ surfaces are detected by identifying wheel slip based on an expected wheel torque to wheel acceleration relationship.

In the variator control mode, a variator ratio control is achieved by observing multiple vehicle parameters and adjusting the relative pressure in the primary and secondary sheaves to achieve a shift rate. Pressure is modulated so that neither the primary nor secondary pulley 210 and 212 clamps at less than a defined safety factor, which is the transmittable torque before slip, divided by the instantaneous torque.

In the engine anti-stall mode, the controller constantly monitors engine speed, and if the engine speed dips below a defined threshold for some time, and during certain conditions, it will open the launch clutch to prevent the engine from stalling.

In the cold weather warmup strategy mode, at very low temperatures, oil viscosity increases exponentially with temperature. A warm-up strategy is required before high-speed operating at very low temps, to avoid pump cavitation. The transmission may require some idle time to allow the hydraulic fluid to warm up prior to operation. In an embodiment, the controller 110 (which may be an engine control module) restricts crankshaft speed until a sump temperature requirement is met.

In the hydraulic temperature compensation mode, operating instructions relating to valve control may cause the controller 110 to change based on sump temp. In an embodiment, a valve dither frequency and amplitude are modulated based on sump temperature.

In the high-speed key-off damage protection mode, in the event of a key-off command being activated while the vehicle is at speed, a safety strategy to protect the CVT 106 from slip will initiate. In an embodiment, the TCM will not power down immediately upon key-off.

In the EOL testing and calibration mode, hydraulic valves will be calibrated for their current to pressure relationship at the end of line. It is a mode the transmission into for executing calibration and function testing at the end of the production line. If the controller 110 is programmed separately, these calibration values may be tied to a transmission serial number or could be printed onto a QR or barcode that would be stuck to the transmission. Controller 110 programming would scan the code to upload calibration values.

In the variator ratio dither mode, CVT 106 may slowly dither ratio to spread thermal, abrasive and contact loads across a wider band of the sheave face.

In the launch clutch kiss-point adaption mode, the controller 110, based on the operating instructions, may detect how much valve current the vehicle 100 is needed to see first movement. This data may be used to continuously update launch clutch kiss-point.

In the variator feed forward adaptation mode, the controller 110, based on the operating instructions, continuously examines the present ratio and calculates the ratio of primary force to secondary force needed to maintain ratio. The observed force ratio is used to improve the feed forward on the variator control and accommodate part wear.

In the drag removal strategy mode, in a dog shift range box, any residual torque on the dogs can cause a torque bind situation between the dog and the shaft. This means that the dog will not easily slide on the shaft to disengage, increasing user effort in a cable or lever shift device, or requiring a powerful actuator in an actuator-shift device. The ATM clutch 202 can be opened, removing drag induced from the CVT 106 to make shifting require less effort.

With the variator backshift function ATM clutch 202 is opened up, the launch clutch 120 is closed at a fixed pressure, and fixed pressure is applied to the primary and secondary pulleys 210 and 212. This function activation ensures the CVT 106 returns to a full underdrive ratio in preparation for the next pull away. Backshift is a term that refers to a downshift event in a CVT (shift toward a higher numerical variator gear ratio) as opposed to a discrete event in a multiple gear transmission.

Example Embodiments

Example 1 includes a vehicle with a CVT that has operational modes. The vehicle includes a motor, a driveline, at least one actuator, at least one sensor, a memory and a controller. The motor provides engine torque. The CVT is configured to couple torque between the motor and the driveline. The CVT includes a primary pulley, a secondary pulley, and an endless looped member. The primary pulley is in operational communication with the motor. The secondary pulley is in operational communication with the driveline. The endless looped member operationally couples the primary pulley and the secondary pulley. The at least one actuator is in operational communication with the CVT to selectively set operating characteristics of the CVT. The memory is used to store operating instructions including operational modes. The operational modes included at least one of an adjustable descent control mode, a descent mode cruise control mode; a tractor mode and an automatic differential lock mode. The controller is in communication with the memory, the at least one sensor and the at least one actuator. The controller is configured to control the at least one actuator based on at least one of the operational modes stored in the memory.

Example 2 includes the vehicle of Example 1, wherein the controller is configured to implement the adjustable descent control mode by utilizing a transmission ratio of the CVT to one of increase and decrease an engine speed of the motor.

Example 3 includes the vehicle of Example 1, wherein the controller is configured to implement the descent mode cruise control mode by modulating a transmission ratio of the CVT based at least in part on engine speed of the motor.

Example 4 includes the vehicle of Example 1, wherein the controller is configured to manipulate engine torque to control engine braking on backshift during low pedal deceleration events.

Example 5 includes the vehicle of Example 1, wherein the controller is configured to implement the tractor mode by where engine speed is fixed and vehicle speed is modulated by changing a transmission ratio of the CVT.

Example 6 includes the vehicle of Example 1, wherein the controller is configured to implement the automatic differential lock mode based on one of a gear selector status, a user selected transmission mode, and in response to driving conditions.

Example 7 includes the vehicle of any of the Examples 1-6, further including: a launch clutch positioned between the motor and the primary pulley of the CVT.

Example 8 includes the vehicle of Example 7, wherein the launch clutch is activated by the at least one actuator as the result of an implementation of at least one operating mode by the controller.

Example 9 includes the vehicle of any of the Examples 1-8, wherein the driveline further includes an active torque management (ATM) clutch, the at least one actuator activates the ATM clutch in implementing at least one of the operational modes.

Example 10 includes the vehicle of any of the Examples 1-9, wherein the driveline includes a gear box includes a park gear, a low gear, a high gear, and at least one shift dog used to select a desired gear.

Example 11 includes the vehicle of any of the Examples 1-10, wherein the operational modes further include at least one of an adaptive gross vehicle weight (GVW) operational mode, cruise control mode, a desert/dune riding mode, a discrete gear transmission mimic mode, an operator customized mode, a dyno mode, an engine braking mode, a fuel economy mode, a hill descent/mountain mode, a military mode, a mud mode, a NVH (quiet) mode, a paddle shift mode, performance/sport mode, a plow mode, a rock crawl mode, shuttle shift mode, a snow mode, a supervisor mode, a tow mode, a track mode, a trailer backup mode, a turf mode/traction limit mode, a work mode, an actuator park engage/disengage mode, a launch control mode, a high altitude adjustment mode, a hill hold mode, a personalized key fob mode, an engine rpm dynamic mode, a vehicle creep mode, a tire diameter adaptive mode, a jump mode, shift-on-the-fly mode, a gradient detection mode, an engine speed trajectory shaping mode, a gravel/low coefficient of friction mode, a tire slip detection mode, a pulley fixed pressure mode, a self-clean inhibit function mode, a valve self-clean mode, a clutch thermal protection mode, a wheel lockup/panic stop routine mode, a wide open throttle strategy mode, an active torque management control strategy mode, a rollback strategy mode, a launch clutch control strategy mode, a variator target ratio selection mode, a variator control mode, an engine anti-stall mode, a cold weather warmup strategy mode, a hydraulic temperature compensation mode, an end of line testing and calibration mode, a variator dither mode, a launch clutch kiss-point adaption mode, a variator feed forward adaption mode, a drag removal strategy mode, and a variator backshift function mode.

Example 12 includes vehicle with a CVT having operational modes. The vehicle includes a motor to provide engine torque; a driveline, a CVT, launch clutch, at least one actuator, at least one sensor, at least one memory and a controller. The driveline includes an ATM clutch. The CVT is configured to couple torque between the motor and the driveline. The CVT includes a primary clutch, a secondary clutch and an endless looped member. The primary pulley is in operational communication with the motor. The secondary pulley is in operational communication with the driveline. The endless looped member operationally coupling the primary pulley and the secondary pulley. The launch clutch is positioned between the motor and the primary pulley of the CVT. The at least one actuator is in operational communication with the CVT to selectively set operating characteristics of the CVT and selectively activate the launch clutch. The memory stores operating instructions including operational modes. The operational modes included at least one of an adjustable descent control mode, a descent mode cruise control mode; a tractor mode and an automatic differential lock mode. The controller is in communication with the memory, the at least one sensor and the at least one actuator. The controller is configured to control the at least one actuator to control at least one of the CVT and the launch clutch based at least in part on at least one of the operational modes stored in the memory to control operations.

Example 13 include the vehicle of Example 12, wherein the controller is further configured to control at least one of the CVT and the launch clutch based on sensor data from the at least one sensor.

Example 14 include the vehicle of any of the Examples 12-13, wherein the at least one sensor provides sensor data relating to at least one of accelerator pedal position, brake pedal position, wheel position, transmission shaft speed, axle shaft speed, prop shaft speed, engine crankshaft speed, acceleration, orientation, position, radar, image, suspension load, transmission sump oil temp, transmission hydraulic pressures, steering angle, traction, altimeter, and incline.

Example 14 include the vehicle of any of the Examples 12-14, wherein the operating modes include at least one of an adaptive gross vehicle weight (GVW) operational mode, cruise control mode, a desert/dune riding mode, a discrete gear transmission mimic mode, an operator customized mode, a dyno mode, an engine braking mode, a fuel economy mode, a hill descent/mountain mode, a military mode, a mud mode, a NVH (quiet) mode, a paddle shift mode, performance/sport mode, a plow mode, a rock crawl mode, shuttle shift mode, a snow mode, a supervisor mode, a tow mode, a track mode, a trailer backup mode, a turf mode/traction limit mode, a work mode, an actuator park engage/disengage mode, a launch control mode, a high altitude adjustment mode, a hill hold mode, a personalized key fob mode, an engine rpm dynamic mode, a vehicle creep mode, a tire diameter adaptive mode, a jump mode, shift-on-the-fly mode, a gradient detection mode, an engine speed trajectory shaping mode, a gravel/low coefficient of friction mode, a tire slip detection mode, a pulley fixed pressure mode, a self-clean inhibit function mode, a valve self-clean mode, a clutch thermal protection mode, a wheel lockup/panic stop routine mode, a wide open throttle strategy mode, an active torque management control strategy mode, a rollback strategy mode, a launch clutch control strategy mode, a variator target ratio selection mode, a variator control mode, an engine anti-stall mode, a cold weather warmup strategy mode, a hydraulic temperature compensation mode, an end of line testing and calibration mode, a variator dither mode, a launch clutch kiss-point adaption mode, a variator feed forward adaption mode, a drag removal strategy mode, and a variator backshift function mode.

Example 16 includes a method of operating a vehicle with a CVT having operational modes. The method includes monitoring at least one sensor of the vehicle for sensor signals; determining at least one operational mode selected for the CVT; and implementing the at least one selected operational mode selected for the CVT by at least in part controlling a transmission ratio based on a transmission map associated with the at least selected operational mode and the sensor signals, wherein the at least one selected operational mode includes at least one of an adjustable descent control mode, a descent mode cruise control mode; a tractor mode and an automatic differential lock mode.

Example 17 includes the method of Example 16, further including controlling a launch clutch positioned between a motor and the CVT to implement the at least one operational mode.

Example 18 includes the method of and of the Example 16-17, wherein the at least one operational mode is selected by one of an operator, a third party, and a manufacturer of the vehicle.

Example 19 includes the method of any of the Examples 16-18, further including determining if a new operational mode is selected; and implementing a new transmission control strategy associated with the new operation mode when it is determined a new operational mode has been selected.

Example 20 includes the method of any of the Examples 16-19, wherein the at least one operational mode includes at least one of an adaptive gross vehicle weight (GVW) operational mode, cruise control mode, a desert/dune riding mode, a discrete gear transmission mimic mode, an operator customized mode, a dyno mode, an engine braking mode, a fuel economy mode, a hill descent/mountain mode, a military mode, a mud mode, a NVH (quiet) mode, a paddle shift mode, performance/sport mode, a plow mode, a rock crawl mode, shuttle shift mode, a snow mode, a supervisor mode, a tow mode, a track mode, a trailer backup mode, a turf mode/traction limit mode, a work mode, an actuator park engage/disengage mode, a launch control mode, a high altitude adjustment mode, a hill hold mode, a personalized key fob mode, an engine rpm dynamic mode, a vehicle creep mode, a tire diameter adaptive mode, a jump mode, shift-on-the-fly mode, a gradient detection mode, an engine speed trajectory shaping mode, a gravel/low coefficient of friction mode, a tire slip detection mode, a pulley fixed pressure mode, a self-clean inhibit function mode, a valve self-clean mode, a clutch thermal protection mode, a wheel lockup/panic stop routine mode, a wide open throttle strategy mode, an active torque management control strategy mode, a rollback strategy mode, a launch clutch control strategy mode, a variator target ratio selection mode, a variator control mode, an engine anti-stall mode, a cold weather warmup strategy mode, a hydraulic temperature compensation mode, an end of line testing and calibration mode, a variator dither mode, a launch clutch kiss-point adaption mode, a variator feed forward adaption mode, a drag removal strategy mode, and a variator backshift function mode.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A vehicle with a continuously variable transmission (CVT) having operational modes, the vehicle comprising:
    a motor to provide engine torque;
    a driveline;
    a CVT configured to couple torque between the motor and the driveline, the CVT including,
        a primary pulley in operational communication with the motor,
        a secondary pulley in operational communication with the driveline, and
        an endless looped member operationally coupling the primary pulley and the secondary pulley;
    at least one actuator in operational communication with the CVT to selectively set operating characteristics of the CVT;
    at least one sensor;
    a memory used to store operating instructions including operational modes that are selected by one of an operator, a third party and a manufacturer of the vehicle, the operational modes including at least one of an adjustable descent control mode, a descent mode cruise control mode; a tractor mode and an automatic differential lock mode; and
    a controller in communication with the memory, the at least one sensor and the at least one actuator, the controller configured to control the at least one actuator based on at least one of the operational modes stored in the memory.

2. The vehicle of claim 1, wherein the controller is configured to implement the adjustable descent control mode by utilizing a transmission ratio of the CVT to one of increase and decrease an engine speed of the motor.

3. The vehicle of claim 1, wherein the controller is configured to implement the descent mode cruise control mode by modulating a transmission ratio of the CVT based at least in part on engine speed of the motor.

4. The vehicle of claim 1, wherein the controller is configured to manipulate engine torque to control engine braking on backshift during low pedal deceleration events.

5. The vehicle of claim 1, wherein the controller is configured to implement the tractor mode by where engine speed is fixed and vehicle speed is modulated by changing a transmission ratio of the CVT.

6. The vehicle of claim 1, wherein the controller is configured to implement the automatic differential lock mode based on one of a gear selector status, a user selected transmission mode, and in response to driving conditions.

7. The vehicle of claim 1, further comprising:
    a launch clutch positioned between the motor and the primary pulley of the CVT.

8. The vehicle of claim 7, wherein the launch clutch is activated by the at least one actuator as the result of an implementation of at least one operating mode by the controller.

9. The vehicle of claim 1, wherein the driveline further comprises
    an active torque management (ATM) clutch, the at least one actuator activates the ATM clutch in implementing at least one of the operational modes.

10. The vehicle of claim 1 wherein the driveline includes a gear box including:
    a park gear;
    a low gear;
    a high gear; and
    at least one shift dog used to select a desired gear.

11. The vehicle of claim 1, wherein the operational modes further include at least one of an adaptive gross vehicle weight (GVW) operational mode, cruise control mode, a desert/dune riding mode, a discrete gear transmission mimic mode, an operator customized mode, a dyno mode, an engine braking mode, a fuel economy mode, a hill descent/mountain mode, a military mode, a mud mode, a NVH (quiet) mode, a paddle shift mode, performance/sport mode, a plow mode, a rock crawl mode, shuttle shift mode, a snow mode, a supervisor mode, a tow mode, a track mode, a trailer backup mode, a turf mode/traction limit mode, a work mode, an actuator park engage/disengage mode, a launch control mode, a high altitude adjustment mode, a hill hold mode, a personalized key fob mode, an engine rpm dynamic mode, a vehicle creep mode, a tire diameter adaptive mode, a jump mode, shift-on-the-fly mode, a gradient detection mode, an engine speed trajectory shaping mode, a gravel/low coefficient of friction mode, a tire slip detection mode, a pulley fixed pressure mode, a self-clean inhibit function mode, a valve self-clean mode, a clutch thermal protection mode, a wheel lockup/panic stop routine mode, a wide open throttle strategy mode, an active torque management control strategy mode, a rollback strategy mode, a launch clutch control strategy mode, a variator target ratio selection mode, a variator control mode, an engine anti-stall mode, a cold weather warmup strategy mode, a hydraulic temperature compensation mode, an end of line testing and calibration mode, a variator dither mode, a launch clutch kiss-point adaption mode, a variator feed forward adaption mode, a drag removal strategy mode, and a variator backshift function mode.

12. A vehicle with a continuously variable transmission (CVT) having operational modes, the vehicle comprising:
    a motor to provide engine torque;
    a driveline, the driveline including an active torque management (ATM) clutch;
    a CVT configured to couple torque between the motor and the driveline, the CVT including,
        a primary pulley in operational communication with the motor,
        a secondary pulley in operational communication with the driveline, and
        an endless looped member operationally coupling the primary pulley and the secondary pulley;
    a launch clutch positioned between the motor and the primary pulley of the CVT;

at least one actuator in operational communication with the CVT to selectively set operating characteristics of the CVT and selectively activate the launch clutch;

at least one sensor;

a memory store operating instructions including operational modes, the operational modes including at least one of an adjustable descent control mode, a descent mode cruise control mode; a tractor mode and an automatic differential lock mode; and a controller in communication with the memory, the at least one sensor and the at least one actuator, the controller configured to control the at least one actuator to control at least one of the CVT and the launch clutch based at least in part on at least one of the operational modes stored in the memory to control operations.

13. The vehicle of claim 12, wherein the controller is further configured to control at least one of the CVT and the launch clutch based on sensor data from the at least one sensor.

14. The vehicle of claim 12, wherein the at least one sensor provides sensor data relating to at least one of accelerator pedal position, brake pedal position, wheel position, transmission shaft speed, axle shaft speed, prop shaft speed, engine crankshaft speed, acceleration, orientation, position, radar, image, suspension load, transmission sump oil temp, transmission hydraulic pressures, steering angle, traction, altimeter, and incline.

15. The vehicle of claim 12, wherein the operating modes include at least one of an adaptive gross vehicle weight (GVW) operational mode, cruise control mode, a desert/dune riding mode, a discrete gear transmission mimic mode, an operator customized mode, a dyno mode, an engine braking mode, a fuel economy mode, a hill descent/mountain mode, a military mode, a mud mode, a NVH (quiet) mode, a paddle shift mode, performance/sport mode, a plow mode, a rock crawl mode, shuttle shift mode, a snow mode, a supervisor mode, a tow mode, a track mode, a trailer backup mode, a turf mode/traction limit mode, a work mode, an actuator park engage/disengage mode, a launch control mode, a high altitude adjustment mode, a hill hold mode, a personalized key fob mode, an engine rpm dynamic mode, a vehicle creep mode, a tire diameter adaptive mode, a jump mode, shift-on-the-fly mode, a gradient detection mode, an engine speed trajectory shaping mode, a gravel/low coefficient of friction mode, a tire slip detection mode, a pulley fixed pressure mode, a self-clean inhibit function mode, a valve self-clean mode, a clutch thermal protection mode, a wheel lockup/panic stop routine mode, a wide open throttle strategy mode, an active torque management control strategy mode, a rollback strategy mode, a launch clutch control strategy mode, a variator target ratio selection mode, a variator control mode, an engine anti-stall mode, a cold weather warmup strategy mode, a hydraulic temperature compensation mode, an end of line testing and calibration mode, a variator dither mode, a launch clutch kiss-point adaption mode, a variator feed forward adaption mode, a drag removal strategy mode, and a variator backshift function mode.

16. A method of operating a vehicle with a continuously variable transmission (CVT) having operational modes, the method comprising:

monitoring at least one sensor of the vehicle for sensor signals;

determining at least one operational mode selected for the CVT; and implementing the at least one selected operational mode selected for the CVT by at least in part controlling a transmission ratio based on a transmission map associated with the at least selected operational mode and the sensor signals, wherein the at least one selected operational mode includes at least one of an adjustable descent control mode, a descent mode cruise control mode; a tractor mode and an automatic differential lock mode; and wherein the at least one operational mode is selected by one of an operator, a third party and a manufacturer of the vehicle.

17. The method of claim 16, further comprising:

controlling a launch clutch positioned between a motor and the CVT to implement the at least one operational mode.

18. The method of claim 16, further comprising:

determining if a new operational mode is selected; and implementing a new transmission control strategy associated with the new operation mode when it is determined a new operational mode has been selected.

19. The method of claim 16, wherein the at least one operational mode includes at least one of an adaptive gross vehicle weight (GVW) operational mode, cruise control mode, a desert/dune riding mode, a discrete gear transmission mimic mode, an operator customized mode, a dyno mode, an engine braking mode, a fuel economy mode, a hill descent/mountain mode, a military mode, a mud mode, a NVH (quiet) mode, a paddle shift mode, performance/sport mode, a plow mode, a rock crawl mode, shuttle shift mode, a snow mode, a supervisor mode, a tow mode, a track mode, a trailer backup mode, a turf mode/traction limit mode, a work mode, an actuator park engage/disengage mode, a launch control mode, a high altitude adjustment mode, a hill hold mode, a personalized key fob mode, an engine rpm dynamic mode, a vehicle creep mode, a tire diameter adaptive mode, a jump mode, shift-on-the-fly mode, a gradient detection mode, an engine speed trajectory shaping mode, a gravel/low coefficient of friction mode, a tire slip detection mode, a pulley fixed pressure mode, a self-clean inhibit function mode, a valve self-clean mode, a clutch thermal protection mode, a wheel lockup/panic stop routine mode, a wide open throttle strategy mode, an active torque management control strategy mode, a rollback strategy mode, a launch clutch control strategy mode, a variator target ratio selection mode, a variator control mode, an engine anti-stall mode, a cold weather warmup strategy mode, a hydraulic temperature compensation mode, an end of line testing and calibration mode, a variator dither mode, a launch clutch kiss-point adaption mode, a variator feed forward adaption mode, a drag removal strategy mode, and a variator backshift function mode.

* * * * *